M. V. KINNE.
GRASS SEED SOWER.
APPLICATION FILED JULY 24, 1911.
1,008,160.
Patented Nov. 7, 1911.
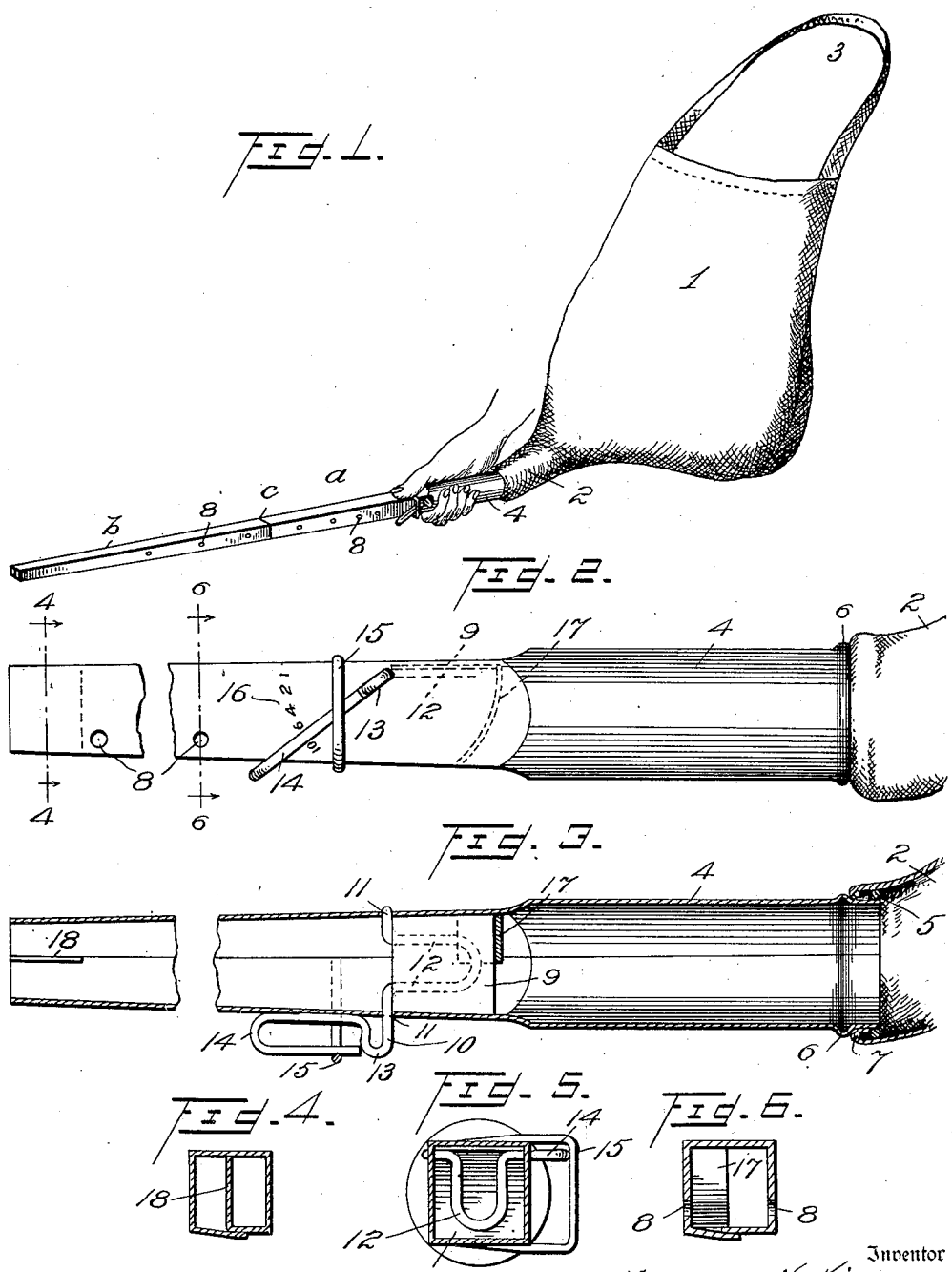

UNITED STATES PATENT OFFICE.

MARTIN V. KINNE, OF FENTON, MICHIGAN, ASSIGNOR TO EARL C. SLOCUM, OF FENTON, MICHIGAN.

GRASS-SEED SOWER.

1,008,160.  Specification of Letters Patent.  Patented Nov. 7, 1911.

Application filed July 24, 1911. Serial No. 640,108.

*To all whom it may concern:*

Be it known that I, MARTIN V. KINNE, a citizen of the United States, residing at Fenton, in the county of Genesee and State of Michigan, have invented certain new and useful Improvements in Grass-Seed Sowers, of which the following is a specification.

This invention relates to grass seed sowers, and one of the principal objects of the invention is to provide a simple hand-operated device for sowing grass seeds broadcast, and to also provide means for regulating the flow of the seed from a receptacle to the discharge tube.

Another object of the invention is to provide a valve of simple construction for regulating the flow of seed through the tube, and to provide means for indicating the quantity of seed to be sown.

Still another object of the invention is to provide a hand-operated grass seeder comprising a tube of rectangular cross section, having perforations arranged in alinement in the opposite walls of the tube, so that as the tube is swung laterally from side to side by the operator, the seeds are forced out and driven through the perforations to insure a uniform and constant flow of seed through the tube.

These and other objects may be attained by means of the construction illustrated in the accompanying drawings, in which, Figure 1 is a perspective view of a grass seed sower made in accordance with my invention, and showing a hand grasping the handle of the instrument in position to swing the same laterally for casting the seed; Fig. 2 is a side elevation of the upper end of the feed tube, a portion of which is broken away near its outer end; Fig. 3 is a longitudinal section taken at right angles to that shown in Fig. 2; Fig. 4 is a transverse sectional view taken on the line 4—4 of Fig. 2 looking in the direction indicated by the arrows; Fig. 5 is a transverse sectional view taken through the tube and showing the feed valve closed; Fig. 6 is a sectional view taken on the line 6—6 of Fig. 2 looking in the direction indicated by the arrows and showing the feed valve removed.

Referring to the drawing, the numeral 1 designates a bag or receptacle for the seed, said bag having at one of its lower corners a tubular extension 2. The bag 1 is provided with a strap 3 which passes around the neck of the operator.

The feed tube is provided with a rounded handle portion 4 at its inner end and this handle portion has a wire bead 5 secured to the tube at its inner end and an outwardly extending bead 6 formed by crimping the handle 4. The tubular portion 2 of the bag is secured between the beads 5 and 6 by tying the same with a cord 7 when turned inside out on the end of the tube 4. The feed tube is substantially rectangular in cross section from the handle portion 4 to its outer end, and formed at intervals in the rectangular portion are alined apertures 8 in the opposite side walls of the tube. The apertures 8 are slightly below the longitudinal axis of the tube, as shown. The feed tube may be made in two sections *a* and *b*, connected together at *c* by a frictional joint.

At a point near the handle portion a rectangular valve 9 is connected to a lever 10, said lever being pivoted as at 11, in the sides of the tube and provided with a loop 12 to which the valve 9 is secured. Upon one side the lever is bent outwardly as at 13 and is formed into a handle 14 which extends through a guide 15 secured to the tube upon one side thereof. A scale 16 is provided on the side of the tube to indicate the quantity of seed being fed through the tube. For holding the valve in any of its adjusted positions, I have provided a curved plate 17 in one side of the tube, said plate engaging the end of the valve 9 frictionally to hold said valve in any of its adjusted positions. In the lower end of the feed tube a deflector 18 is provided for throwing the seed laterally from the discharge end of the tube.

The manner of using my seed sower may be briefly described as follows:—The operator suspends the bag 1 from his neck and grasps the handle 4 with his hand and swings the tube laterally at each step, or if desired at each alternate step. The feed of the seed through the tube may be regulated by means of the valve 9, or the valve 9 may be entirely closed if so desired, to prevent feeding of seed through the tube. As the tube is swung laterally, the draft through the alined apertures 8 carries a quantity of seeds through said apertures, and at the same time causes a regular and uniform flow through the outer end of the tube.

My invention can be manufactured at low cost, and is very efficient for its purpose.

I claim:—

1. A grass seed sower comprising a tube having diametrical oppositely disposed apertures therein, a pivoted valve in the tube, means for holding the valve in any of its adjusted positions, a numbered scale on the side of the tube, and a deflector in the lower end of the tube.

2. In a seed sower a feed tube, a valve in the feed tube, said valve being connected to a pivoted lever, and a plate secured in the tube for frictionally engaging the end of the valve to hold it in any of its adjusted positions.

In testimony whereof I affix my signature in presence of two witnesses.

MARTIN V. KINNE.

Witnesses:
F. H. HITCHCOCK,
C. J. CAMPBELL.

Copies of this patent may be obtained for five cents each, by addressing the "Commissioner of Patents, Washington, D. C."